United States Patent [19]

Ruckel et al.

[11] 4,113,653
[45] Sep. 12, 1978

[54] POLYMERIZATION OF α-PINENE

[75] Inventors: Erwin Richard Ruckel, Darien; Long Shyong Wang, Greenwich, both of Conn.

[73] Assignee: Arizona Chemical Company, Wayne, N.J.

[21] Appl. No.: 814,527

[22] Filed: Jul. 11, 1977

Related U.S. Application Data

[62] Division of Ser. No. 613,777, Sep. 16, 1975, Pat. No. 4,057,682.

[51] Int. Cl.$^2$ ................................................ C08F 4/14
[52] U.S. Cl. ............................ 252/429 B; 252/429 R; 526/190; 526/281
[58] Field of Search .............................. 526/190, 281; 252/429 B, 429 A, 429 C, 429 R

[56] References Cited

U.S. PATENT DOCUMENTS

| | | | |
|---|---|---|---|
| 3,210,334 | 10/1965 | Carrick | 252/429 C X |
| 3,278,508 | 10/1966 | Kahle et al. | 252/431 L X |
| 3,378,539 | 4/1968 | Nowlin et al. | 252/429 A X |

*Primary Examiner*—Patrick P. Garvin
*Attorney, Agent, or Firm*—Harry H. Kline

[57] ABSTRACT

There is provided a process for polymerizing α-pinene by adding the same incrementally to a catalyst system comprising a major amount of an aluminum halide and a minor amount of an organo germanium halide or alkoxide in admixture with a (lower) alkyl, alkenyl or aralkyl halide in an inert solvent while controlling the temperature of reaction in the range of −30° C. to +30° C., drowning the polymerization mixture in water, separating the organic phase therefrom, removing the solvent therefrom, and recovering a solid polymer in good yield.

5 Claims, No Drawings

POLYMERIZATION OF α-PINENE

This application is a divisional of our copending application Ser. No. 613,777, filed on Sept. 16, 1975, now U.S. Pat. No. 4,057,682 issued on Nov. 8, 1977.

The present invention relates to a method for polymerizing α-pinene to obtain polymers in good yields. More particularly, it relates to a method for polymerizing alphapinene utilizing a catalyst system comprising a major amount of aluminum chloride and a minor amount of a (lower) alkyl, alkenyl or aralkyl halide containing an alkyl or an aryl geramanium chloride or alkoxide to obtain alpha-pinene polymers having softening points of at least 110° C. and possessing relatively high molecular weights in good yield.

As is known, alpha-pinene has been subjected to polymerization utilizing catalyst systems, such as aluminum chloride in conjunction with either a trialkyl silicon halide or a dialkyl tin dichloride, attention being directed to U.S. Pat. Nos. 3,354,132 and 3,478,007. However, none of the prior methods is entirely satisfactory. This is because the yields obtained are less than quantitative. Moreover, even to obtain such unsatisfactory yields, such prior procedures strongly suggest the necessity to effect drying or removal of water from the monomer and other components of the mixture prior to polymerization. In our copending application, Ser. No. 576,672, filed on May 12, 1975, now abandoned a process is provided for insuring high yields hitherto unobtainable without necessarily drying the components of the unpolymerized mixture by polymerizing alpha-pinene with aluminum chloride-organo germanium halide. However, due to the present high cost of organo germanium halide, if a process could be provided whereby the cost is substantially reduced without dramatically decreasing yield of desired product, such a process would fulfill a need long sought for in the art.

It is, therefore, a principal object of the invention to provide a straightforward process for polymerizing alpha-pinene. It is a further object to polymerize alpha-pinene utilizing a catalyst system comprising aluminum chloride and an alkyl or an aryl germanium halide in admixture with an alkyl, alkenyl or aryl halide to obtain polymers in yields hitherto unavailable. It is a still further object to obtain alpha-pinene polymers from corresponding monomers which have not been previously dried to remove water therefrom. Other objects and advantages will become apparent from a reading of the ensuing description.

To this end, it has been found that alpha-pinene can be polymerized in a straightforward manner to obtain corresponding polymers in good yield. Unexpectedly, a catalyst system comprising suitable amounts of aluminum chloride and either an alkyl or an aryl germanium halide in the presence of alkyl, alkenyl or aryl halide utilized during polymerization of untreated alpha-pinene causes the polymerization of the monomer to proceed at least to an extent known when utilizing more expensive germanium catalysts per se.

Thus, according to the process of the invention, alpha-pinene is subjected to polymerization in the presence of a catalyst system mixture consisting of a major amount of aluminum chloride or bromide and a minor amount of an alkyl, an alkenyl or an aralkyl halide in the presence of a lower alkyl germanium chloride or an aryl germanium chloride. In so proceeding the organo germanium chloride is diluted with the alkyl or aryl halide so as to attain highly desired yields at reduced costs.

In general, there is first prepared a solution of the aforementioned catalyst system in an inert solvent. Alpha-pinene is then added incrementally with vigorous stirring while maintaining the reaction mixture at from about minus 15°. to about minus 20° C. to insure maximum yield of resin of high softening point. After the alpha-pinene has been added, stirring and cooling are continued for at least 15 minutes or until the amount of unreacted monomer is substantially reduced. Thereafter, the mixture is permitted to rise slowly to a temperature of about 20° C. over a period of 1 to 4 hours. The reaction mixture is quenched with water or dilute hydrochloric acid with the production of an organic phase and an aqueous phase. Resultant polymer is then recovered as a residue after removal of the organic solvent, as by steam distillation.

Exemplary solvents or diluents include aromatic hydrocarbons and, preferably, toluene, mixed xylene, diethyl benzenes, Solvesso 100 (98% aromatic, 0.876 sp. gr., 166° F. closed cup flash point, 321° F. initial boiling point, 50% off at 328° F., 349° end point). Other sovents that can be employed are halogenated hydrocarbons, both aliphatic and aromatic, such as methylene chloride, ethyl chloride or chlorobenzene.

The organo germanium halide or alkoxide utilized in the process of this invention can be represented by the formula:

where R is lower alkyl or aryl, X is halogen or lower alkoxide, $y$ is an integer from 1 to 3 and $n$ is 4-y.

Such organo germanium halide or alkoxide synergist component employed are illustrated as:

trimethyl germanium chloride,
trimethyl germanium methoxide,
triethyl germanium chloride,
triethyl germanium ethoxide,
tri-n-propyl germanium chloride,
tri-n-propyl germanium bromide,
tri-isopropyl germanium chloride,
tri-n-butyl germanium iodide,
tri-t-butyl germanium chloride,
dimethyl germanium dichloride,
dimethyl germanium dimethoxide,
diethyl germanium dichloride,
diethyl germanium dibromide,
diethyl germanium diiodide,
di-n-propyl germanium dichloride,
di-isopropyl germanium dibromide,
di-n-butyl germanium dichloride,
monoethyl germanium trichloride,
monoethyl germanium triethoxide,
monopropyl germanium trichloride,
monopropyl germanium trifluoride,
diphenyl germanium dichloride,
diphenyl germanium dibromide,
triphenyl germanium bromide,
triphenyl germanium iodide
mononaphthyl germanium trichloride,
mononaphthyl germanium triiodide,
trinaphthyl germanium chloride,
trinaphthyl germanium bromide,
trinaphthyl germanium methoxide,
trinaphthyl germanium iodide,
trinaphthyl germanium fluoride,
and equivalents of the same.

Exemplary co-catalysts are: lower alkyl halides such as isopropyl chloride, n-propyl bromide, t-butyl chloride, allyl chloride, sec-butyl bromide, benzyl chloride, benzyl bromide and equivalents thereof.

The ratio of mixture of the alkyl, alkenyl or aralkyl halide and the organo germanium synergist to aluminum chloride or bromide comprising the overall catalyst system may vary within wide limits. A ratio of from 0.08 to 1.5 weight percent, and preferably from 0.2 to 0.8 weight percent, germanium constituent in admixture with an alkyl, alkenyl or aralkyl halide cocatalyst to from 2 to 10 weight percent and, preferably from 3 to 5 weight percent of aluminum chloride or bromide is utilized. It has been found that satisfactory results are particularly attained with catalyst system comprising 5 weight percent of aluminum chloride and 0.6 weight percent of a trialkyl germanium halide or a triaryl germanium halide synergist plus alkyl, alkenyl, aralkyl or halide, the weight percent being based on the alpha-pinene monomer treated. Further, from 0.4 to 1.0% of the alkyl, aralkyl or alkenyl halide and from 0.08 to 0.1% of the germanium halide based on the overall catalyst component is a good operative range.

Advantageously, in the production of the high yields of high softening point resin which characterize the present invention, both the alpha-pinene reactant and the inert solvent can be utilized without the removal of water therefrom. For instance, it is known that a solvent can contain as much as 400 ppm water and the monomer can similarly contain as much as 200 ppm water under ambient conditions. Greater amounts of water, however, cannot be tolerated without concomitant reductions in yields of polymer. Alternatively, if desired, the solvent and monomer can be dried prior to reaction by azeotropic removal of water or by their passage through a drying agent.

In a preferred practice of the invention, alpha-pinene and solvent are each employed undried, that is, with from about 100 to about 300 ppm of detectable water. The overall system is next flushed with an inert gas, suitably nitrogen. The solvent and catalyst system are introduced into the vessel and alpha-pinene is then added incrementally and progressively, for instance, in dropwise fashion, while vigorously stirring the reaction medium. As soon as the alpha-pinene addition begins, an exotherm occurs and cooling is applied to maintain the reaction medium at from minus 15° C. to minus 20° C. Stirring and temperature control at this level are continued for a period of time, generally 30 minutes, after all of alpha-pinene had been added. Some fifteen minutes to four hours suffices for the latter purpose. Thereafter, the temperature is allowed to gradually rise over a period of from 1 to 2 hours to 20° C. to 25° C., where it is maintained for from two to four hours. Normally, reaction is continued until essentially all monomer is converted.

At the end of this time, the reaction medium is quenched to inactivate the catalyst, as by adding a volume of water equal to the volume of alpha-pinene used. If desired, there may be used a dilute solution of an acid, such as hydrochloric acid, instead of water. In either case there are formed two layers, one of which constitutes a hydrocarbon phase and the other is an aqueous phase. These are separated and the hydrocarbon phase is washed repeatedly with equal amounts of water until neutral.

The hereinabove employed alpha-pinene can be of quite high purity. For instance, alpha-pinene of 95 percent purity is commercially available from Arizona Chemical Company (sold as Acintene A) and will give excellent results.

In order to facilitate a further understanding of the invention, the following examples are presented primarily for purposes of illustrating certain more specific details thereof. The invention is not to be deemed limited thereby except as defined in the claims. Unless otherwise noted, the parts and percentages are by weight.

EXAMPLE 1

To a suitable three-neck flask are introduced 210 parts of xylene and there are next added (3 weight percent) of aluminum chloride and in admixture 0.083 weight percent of trimethyl germanium chloride [$(CH_3)_3CeCl$] and 0.99 weight percent of t-butyl chloride providing a weight percent ratio of 0.08:1.0. The resultant mixture is vigorously stirred. 300 Parts of alpha-pinene are then introduced over a period of 30 minutes. The reaction mixture is held at minus 15° C. to minus 20° C. by a cooling bath. Thereafter, the contents of the flask are maintained in an inert nitrogen atmosphere at this temperature for ½ hour. Thereafter, the temperature is allowed to rise gradually with controlled cooling while finally reaching +20° C. to +25° C. after 2½ hours. There is next added water equal in volume to the alpha-pinene used, to inactivate the catalyst system, and to cause separation of the aqueous and organic phases. Resultant phases are separated, and the organic phase is washed three times with equal amounts of water. It is then charged to a suitable flask provided with a heater, thermometer and nitrogen atmosphere, and the temperature raised to 210° C., thereby removing the solvent. The introduction of nitrogen is discontinued and in its place steam is passed in until the temperature reached 230° C. to 240° C. Steaming is continued until the resin softening point reaches the desired limit. Application of vacuum removes any trace of moisture and the molten resin is obtained in 82.5% yield and having:

Softening point: 115° C., ring and ball
Color: Gardner 2
Dimer oil yield: trace

EXAMPLES 2-12

Repeating Example 1 in every detail except that triethyl germanium chloride, trimethyl germanium bromide or diethyl germanium dichloride is substituted for trimethyl germanium chloride, there is obtained alpha-pinene polymer in good yields as set forth in Table I below:

TABLE I

| Example | Synergist Germanium Cocatalyst | Amt. Conventional Cocatalyst | % Yield 115' Resin |
|---|---|---|---|
| 2 | (Me)$_3$GeCl - 0.083% (0.2 ml) | t-BuCl - .50% (1.75 ml) | 81.0 |
| 3 | None | t-BuCl - .50% (1.75 ml) | (42% of oil) |
| 4 | (Et)$_3$GeCl - 0.086% (0.22 ml) | t-BuCl - .57% (2.0 ml) | 69 |
| 5 | (Et)$_3$GeCl - 0.078% (0.20 ml) | C$_6$H$_5$CH$_2$Cl - .73% (2.0 ml) | 65 |
| 6 | (Et)$_3$GeCl - 0.086% (0.22 ml) | CH$_2$=CH—CH$_2$Cl - .62% (2.0 ml) | 64 |
| 7 | (Et)$_3$GeCl - .105% (0.27 ml) | t-BuCl - .76% (2.7 ml) | 70 |
| 8 | (Et)$_3$GeCl - .105% (0.27 ml) | i-PrCl - .45% (1.6 ml) | 67 |

TABLE I-continued

| Example | Synergist Germanium Cocatalyst | Amt. Conventional Cocatalyst | % Yield 115° Resin |
|---|---|---|---|
| 9 | $(Me)_2GeCl_2$ - .10% (0.2 ml) | t-BuCl - .76% (2.7 ml) | 71.5 |
| 10 | $(Et)_3GeCl$ - 0.086% (.22 ml) | None | 36 |
| 11 | $(Me)_3GeBr$ - .103% (0.20 ml) | t-BuCl - .76% (2.7 ml) | 82 |
| 12 | $(Et)_3GeOMe$ - .073% (0.20 ml) | t-BuCl - .76% (2.7 ml) | 60 |

EXAMPLE 13

The procedure of Example 1 is repeated in every detail except that trimethyl germanium bromide in lieu of triethyl germanium chloride is dissolved directly in the monomer feed rather than in the solvent. There results an 84.0% yield of alpha-pinene resin having a s softening point of 113° C.

EXAMPLE 14

The procedure of Example 1 is followed in every detail except that the monomeric alpha-pinene reactant and the solvent are carefully dried. There is obtained a resin yield (polymer) of 83%, based on the weight of the monomer, and a softening point of 115° C.

Alpha-pinene polymers prepared as in Examples 1 to 13 have molecular weights of from about 700 to 900 (by vapor pressure osmometry), and a softening point of at least about 110° C. These polymers are soluble in solvents, such as hexane, benzene, heptane, toluene, xylene and mineral spirits. However, the latter differ from other related polymers, namely, the beta-pinene polymers, in exhibiting solubility in methyl ethyl ketone, dioxane, ethyl acetate and cyclohexanol.

EXAMPLE 15

Alpha-pinene resin as prepared in accordance with Example 1 is extremely light in color and shows exceptionally wide compatability with commonly used polymers and film formers. It has the ability to tackify other materials with which it is compatible, such as styrene-butadiene rubber, natural rubber, ethylene-propylene elastomers chlorobutyl and butyl rubber by methods well known in the art.

We claim:
1. A polymerization catalyst system which comprises:
   (a) a major amount ranging from 2 to 10%, by weight, of aluminum chloride, aluminum bromide or mixtures of the same, and
   (b) a minor amount ranging from 0.08 to 0.1%, by weight, of an alkyl germanium halide or an aryl germanium halide in admixture with from 0.4 to 1.0%, by weight, of an alkyl halide, alkenyl halide or aralkyl halide, said percentages being based on the weight of monomer to be polymerized.
2. The catalyst system of claim 1 wherein the alkyl germanium halide is trimethyl germanium chloride.
3. The catalyst system of claim 1 wherein the alkyl germanium halide is triethyl germanium chloride.
4. The catalyst system according to claim 1 wherein the alkyl halide is t-butyl chloride.
5. The catalyst system according to claim 1 wherein the aryl germanium halide is triphenyl germanium chloride.

* * * * *